United States Patent [19]
Oxley

[11] Patent Number: 5,399,213
[45] Date of Patent: Mar. 21, 1995

[54] METHOD FOR FORMING A SHIRRED FIBROUS CASING ARTICLE

[75] Inventor: Jeffery A. Oxley, Naperville, Ill.

[73] Assignee: Viskase Corporation, Chicago, Ill.

[21] Appl. No.: 196,722

[22] Filed: Feb. 15, 1994

Related U.S. Application Data

[62] Division of Ser. No. 859,783, Mar. 30, 1992, Pat. No. 5,328,733.

[51] Int. Cl.⁶ ............................................. B29C 65/50
[52] U.S. Cl. ...................... 156/86; 156/158; 156/253; 264/154; 264/229; 452/31
[58] Field of Search ............... 156/86, 158, 294, 253; 264/154, 155, 229; 138/118.1; 452/21, 31, 32; 206/802

[56] References Cited

U.S. PATENT DOCUMENTS

| | | | |
|---|---|---|---|
| 1,938,070 | 12/1933 | Friedler | 452/32 |
| 3,528,601 | 9/1970 | Ito et al. | 206/802 |
| 3,528,825 | 12/1967 | Doughty . | |
| 3,639,130 | 2/1972 | Eichin . | |
| 3,679,126 | 7/1972 | Lake | 264/154 |
| 4,007,761 | 2/1977 | Beckman . | |
| 4,017,941 | 4/1977 | Raudys . | |
| 4,032,176 | 6/1977 | Tabary . | |
| 4,610,742 | 9/1986 | Rop et al. | 138/118.1 |
| 4,884,827 | 12/1989 | Kelley | 156/DIG. 5 |
| 4,885,821 | 12/1989 | Farkonas | 138/118.1 |
| 5,092,873 | 3/1992 | Simpson et al. | 606/159 |
| 5,127,873 | 7/1992 | Stanley | 452/198 |

FOREIGN PATENT DOCUMENTS

| | | | |
|---|---|---|---|
| 1308631 | 10/1962 | France . | |
| 1320867 | 2/1963 | France . | |
| 2269868 | 12/1975 | France . | |
| 2452439 | 10/1980 | France . | |
| 595181 | 2/1931 | Germany . | |
| 3608983 | 10/1987 | Germany . | |
| 1506428 | 4/1978 | United Kingdom . | |
| 2041147 | 9/1980 | United Kingdom | 264/269 |

OTHER PUBLICATIONS

Shirmatic 600 System Series A Manual, 1987, pp. 4-11 to 4-16.
Shirmatic Sizer Model 405H 1981, pp. 4.3 to 4.4 and FIG. 15 (p. 4.14).
European Search Report Dated Jun. 7, 1993.

Primary Examiner—Michael W. Ball
Assistant Examiner—Steven D. Maki
Attorney, Agent, or Firm—R. Aceto

[57] ABSTRACT

A shirred fibrous casing article containing about 20% to about 30% moisture by total casing weight and composed of shirred portions spliced together and retained in an overwrap wherein a flag which identifies the splice location between the shirred portions is extended radially through the overwrap.

5 Claims, 1 Drawing Sheet

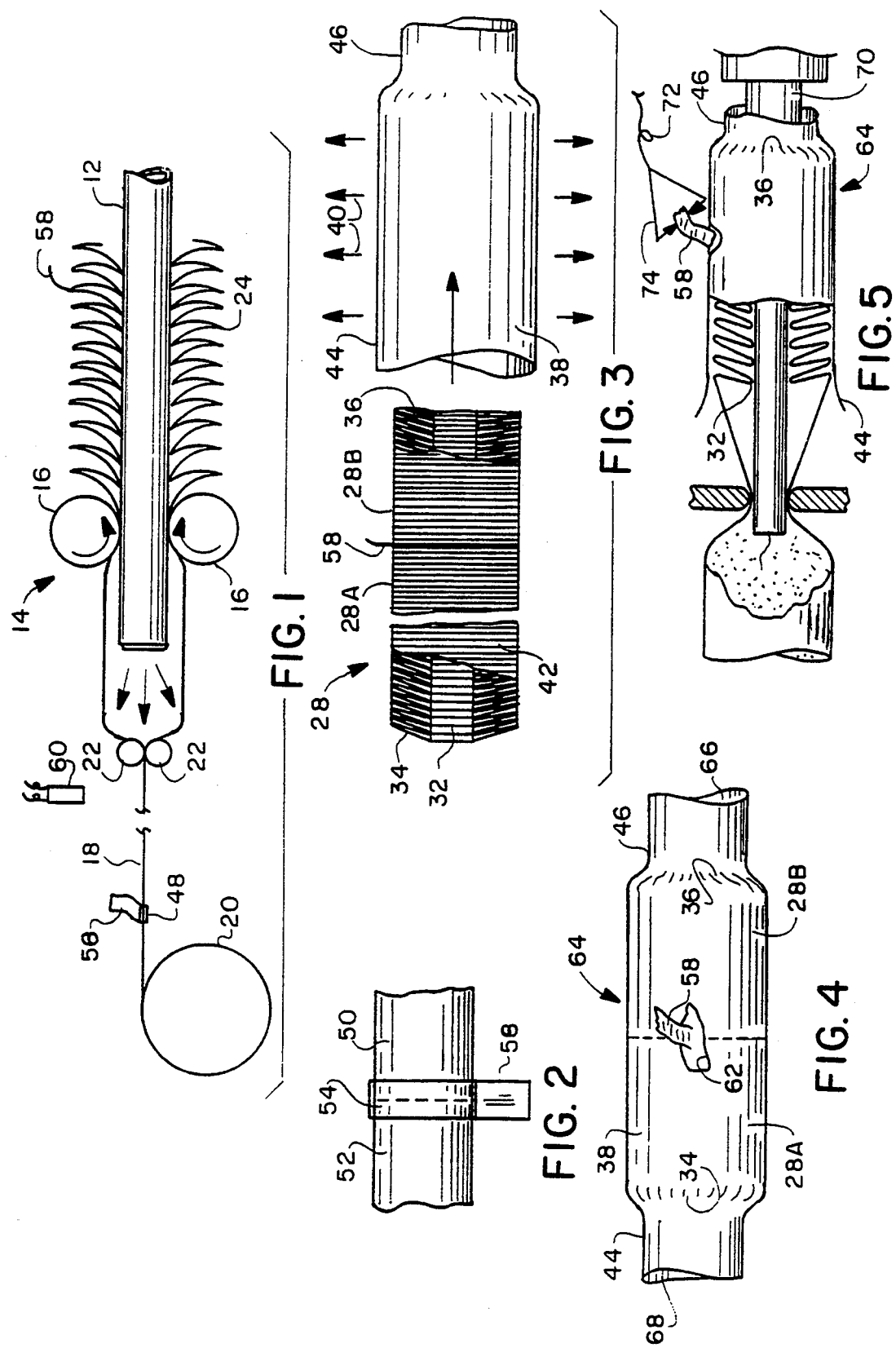

METHOD FOR FORMING A SHIRRED FIBROUS CASING ARTICLE

This application is a Division of prior U.S. application Ser. No. 07/859,783, filed on Mar. 30, 1992, now U.S. Pat. No. 5,328,733.

TECHNICAL FIELD

The present invention relates to a stick of shirred fibrous casing and more particularly to a shirred tubular casing retained in an overwrap.

BACKGROUND OF THE INVENTION

Artificial food casings are used throughout the world in the processing of a great variety of meat and other food products including sausages of various types, products made from emulsified formulations, chunk and formed products and whole muscle products.

Various materials are used for forming artificial food casings including collagen and plastic films but a most common material is regenerated cellulose. One type of cellulose food casings, known in the art as "fibrous casing" is formed with a reinforcing fibrous material (such as paper) in the cellulose casing wall. Fibrous casing generally range in size from about 50 mm to 160 mm or more in diameter and have a wall thickness of about 0.07 mm to about 0.10 mm. Methods for forming fibrous casing using a regenerated cellulose are well known in the art and form no part of the present invention.

Fibrous casings are provided to the meat processor in one of several forms. One form called a "cut-length" is a relatively short piece of fibrous casing up to about 2.5 meters long. Each cut length, manually gathered onto a stuffing horn, provides sufficient casing for making only one, or at most, only a few stuffed products.

Fibrous casing also is sold in shirred form. Shirred casing is a relatively long casing length which has been gathered into closely nested pleats to considerably reduce the length of the casing article. For example, a shirred casing article may contain upwards of 70-80 meters of casing. Once a shirred casing article is placed on the horn of a stuffing machine, the machine can be run continuously for automatically producing a large number of stuffed products one after another.

Various shirring methods and apparatus are well known in the art including those disclosed in U.S. Pat. Nos. 2,983,949; 2,984,574; 3,454,982; and 3,988,804 among others.

For purposes of the present invention, it is sufficient to say that shirring involves inflating the casing and moving it onto a shirring mandrel where it is gathered into closely nested pleats formed against the mandrel. The shirred casing is longitudinally compacted to further reduce its length. The result, when the shirred casing is doffed from the mandrel, is a shirred casing article, sometimes referred to as a "shirred stick" having an internal bore to accommodate a stuffing horn.

Casing for shirring is supplied as feed stock in the form of a flat tube wound onto reels. Each reel contains upwards of 450-460 meters or more of casing. During shirring the flat tube is drawn from the reel and is inflated, shirred and then longitudinally compressed as described above to form individual sticks up to about 70-80 cm long with each stick containing 70-80 meters of casing. The length of the stick and the length of casing it contains depends in part on the diameter of the casing and diameter of the stuffing horn on which the casing is used.

Shirred sticks of fibrous casing do not retain their integrity because the tightly nested pleats tend to separate or deshirr so the coherency and integrity of the stick is broken. This renders the stick difficult to load onto a stuffing horn because the stick bore is no longer straight and uniform. Accordingly, techniques have been developed to maintain the integrity of a stick and facilitate handling. These techniques involve either the use of an internal or an external restraint.

An internal restraint generally is a tube which extends through the stick bore. In some cases pegs extending transversely through the tube at either end of the shirred stick holds the stick on the tube and maintains the integrity of the stick. In other cases the tube outside diameter and the bore diameter of the stick are selected and controlled so the casing pleats grip tightly about the tube with sufficient force to prevent an expansion and separation of the tightly nested pleats. External restraints include tubular netting which is drawn over the stick and then is gathered and closed over the ends of the stick. Other external restrains include tubular plastic film which is stretched over the stick. These plastic films contract or shrink down and press firmly against the outer surface of the stick and encompass at least a portion of the opposite ends of the stick to hold the stick together.

Fibrous casing articles in plastic film overwraps generally contain sufficient moisture to permit stuffing the casing as-is. The plastic film overwrap not only serves to retain the integrity of the stick but also helps to retard the loss of moisture. This ready-to-stuff casing is to be distinguished from fibrous casing which requires soaking prior to stuffing. Fibrous casings requiring soaking generally are packaged in netting to permit free access of the soak water to the surface of the casing article.

One problem associated with shirred fibrous casing is that the supply reel of feed stock casing for shirring is likely to contain one or more splices. This is because it is difficult to form a single casing length 450-460 meters long so shorter lengths are spliced together in order to obtain the total casing to fill a supply reel.

These splices are objectionable because even though the splice is able to pass through the shirring apparatus and become incorporated into a shirred stick, the splice is not stuffable. The presence of a splice is tolerated where the casing article is a shirred stick retained on a tubular core. In this case, the splice itself is evident by the color of the splice tape and is accessible because the outer surface of the shirred stick is not enclosed.

Certain stuffing machines as disclosed for example in U.S. Pat. No. 4,017,941, include an automatic shut-off to terminate the stuffing operation when the casing runs out. When stuffing a cored casing article containing a splice, on such a machine, the operator puts the casing article onto a stuffing horn and attaches a lanyard to the splice or to the casing pleats adjacent the splice. As casing is drawn forward from the shirred stick during stuffing, the lanyard eventually will pull taught and trigger operation of an end-of-casing sensor on the stuffing machine. This initiates a sequence of events for terminating the stuffing operation before the splice is stuffed. The operator now can clear the splice through the stuffing machine. After the splice is cleared through the stuffing machine the lanyard is reattached to the last pleats in the shirred stick and the stuffing operation restarted.

With other machines which do not have an automatic shut-off feature, the operator simply monitors the stuffing operation and manually turns the machine off just before the splice is stuffed. Thus, where a splice is present in a cored shirred casing article, it does not interfere with the shirring operation and has only some limited effect on the stuffing operation.

However, where the integrity of a shirred casing article is retained by an overwrap, particularly a plastic film overwrap such as a stretch film, the problem of splices historically has been more acute. The accepted procedure has been for the casing manufacturer to break the shirred stick at the splice, remove the splice and package the pieces of shirred casing in separate overwraps. This adds steps to the shirring operation and is an inconvenience to the shirring machine operator.

Also this procedure results in the production of so called "short sticks" containing less casing than a full length stick which is made with a continuous, unspliced length of casing. Short sticks are undesirable for several reasons. For example, packing cartons are designed to contain casing articles of a specified length. Consequently when packaging a mixture of short and full length sticks in a carton, care must be taken to insure that the short sticks are paired so that their combined length is the same as a full stick. This adds time and steps to the process of filling a carton with casing articles.

Meat processors also object to short sticks because they shorten the time of continuous operation and increase the idle time of the machine by increasing the frequency of stopping the machine to load fresh sticks onto the stuffing horn. Thus, in connection with shirred fibrous casing articles having an overwrap to maintain integrity, splices interrupt the shirring operation, and the resulting short sticks not only complicate packaging requirements, but also interfere with the continuous operation of the stuffing machine. Consequently, elimination of the need to remove splices from overwrapped shirred fibrous casing articles will benefit both the casing manufacturer and the casing user.

OBJECTS OF THE INVENTION

An object of the present invention is to provide a shirred fibrous casing article retained in a plastic film overwrap.

Another object is to provide such a casing article including two or more spliced together sections retained in a single plastic film overwrap.

A further object is to provide a shirred fibrous casing article having a moisture content sufficient for stuffing and including spliced together sections retained in a single plastic film overwrap so as to facilitate both the packaging and stuffing of the casing article.

SUMMARY OF THE INVENTION

In accordance with the present invention there is provided a shirred fibrous casing article having an internal bore opening through opposite ends of the article. The article is composed of at least two spliced-together shirred lengths of fibrous casing having a moisture content of about 20% to 30% of total casing weight. A retainer, disposed about the outer surface of the article and encompassing at least a portion of the opposite ends of the article, maintains the integrity of the article and facilitate handling it. The splice joining the two shirred portions has an attached flag which upstands from the outer surface of the shirred casing and extends through a window in the retainer.

With this arrangement, a full length casing article composed of the spliced portions can be loaded onto a stuffing horn and stuffed in a conventional manner. Since the flag marking the splice extends through the retainer, a lanyard can be attached to the flag and arranged to trigger the termination of the stuffing operation just before the splice is to be stuffed. In the alternative, where the machine does not have an automatic shut-off, the movement of the flag provides a visual signal to the operator to shut off the machine.

The retainer may be any suitable means such as a net or wrap which is disposed about the outer surface and ends of the stick to maintain the integrity of the stick and resist the separation of shirred pleats. Preferably the retainer structure should encompass the ends of the shirred stick in order to hold the stick in compression and yet leave open one or both ends of the stick bore to facilitate loading the casing article onto a stuffing horn.

Most preferably the retainer is a tubular, clear plastic film which is stretched open so the shirred length can be inserted. When the tubular film is released, it will collapse down to the surface of the stick and over the ends of the stick to form a tight overwrap but otherwise will not obstruct the stick bore.

The flag may be attached to the splice but preferably the flag is formed from an excess portion of the splice tape which is provided when the casing is spliced. When the casing is shirred, this excess splice tape portion is extended out from the surface of the shirred stick. The shirred fibrous casing is first inserted into the tubular film and then a window is cut into the film to expose the flag.

Thus, in its method aspect the present invention comprises the steps of shirring a spliced length of fibrous casing containing about 20% to 30% total weight moisture to form a shirred stick having a splice intermediate its ends, extending a splice locating flag from the surface of said shirred stick, disposing said shirred stick in a tubular plastic film overwrap which encompasses at least a portion of the opposite ends of the shirred stick and then extending the flag radially through said overwrap.

The article and method of the present invention will become fully apparent from the following detailed description and the accompanying drawings.

DESCRIPTION OF THE DRAWINGS

FIG. 1 is a schematic representation showing the shirring of a spliced fibrous casing;

FIG. 2 shows a portion of fibrous casing containing a splice;

FIG. 3 illustrates inserting a shirred casing stick into a retaining overwrap;

FIG. 4 shows the casing article of the present invention; and

FIG. 5 shows a stuffing operation utilizing the casing article of the present invention.

DETAILED DESCRIPTION OF THE INVENTION

Referring to the drawings, FIG. 1 shows components of a shirring machine. The shirring machine forms no part of the present invention. It is conventional and may be any one of several types as shown for example in the U.S. Patents mentioned above.

For purposes of the present invention, it is sufficient to say the shirring machine includes a mandrel 12 which extends through a shirring head 14. The shirring head comprises a plurality of toothed shirring rolls 16. In use, feed stock fibrous casing which is fed to the shirring machine is in the form of a flattened tube 18 wound onto a supply roll 20.

The fibrous casing in the supply roll preferably contains a sufficient amount of moisture to provide the casing with the extensibility for stuffing. Generally a sufficient amount of moisture is in the range of about 20% to about 30% or more of the total weight of the casing. The casing of this moisture level preferably also contains an antimycotic agent to retard the growth of mold on the moist fibrous casing. A suitable fibrous casing is disclosed for example in U.S. Pat. No. 4,867,204.

The casing drawn from the supply roll passes through a nip at feed rolls 22 and onto the shirring mandrel. The mandrel is hollow so that air can be supplied through the mandrel to inflate the casing before the casing reaches the shirring rolls wherein the pressure within the casing is retained by the nip at rolls 22. The shirring rolls gather the casing into pleats to form a shirred strand 24. When the shirred strand has reached a desired length, shirring stops, the shirred casing length is severed and the shirred strand is transferred down the mandrel to a compression station (not shown). At the compression station the strand is axially compressed to further compact and tightly nest the pleats one against another. The compressed strand then is pushed further down the mandrel and doffed.

The result as shown in FIG. 3 is a compacted, shirred stick 28 formed of pleats of fibrous casing nested one against the other, wherein the stick has an axial bore 32 opening through the opposite end faces 34, 36 of the stick.

As noted above, the shirred stick of fibrous casing tends to fall apart in that the pleats tend to separate from their compressed, tightly nested relationship. Accordingly, as illustrated in FIG. 3, the shirred stick, composed of two spliced together portions 28A and 28B, is inserted into an overwrap 38. This preferably occurs as the stick is doffed from the shirring mandrel but it also can be done at some later stage.

The preferred overwrap is a clear plastic tubular film longer than the shirred stick. In a preferred arrangement, the plastic film has a diameter smaller than the outside diameter of the stick and is elastic. To insert the shirred stick, a mechanical means, (not shown) diametrically stretches and opens the tubular film (as indicated by arrows 40) to accommodate the entry of the stick. When the mechanical means is released, the tubular film, being elastic, will contract down and tightly overwrap the outer surface 42 of the shirred stick. As the film contracts, its end portions 44, 46 will extend down over part of the stick end faces 34, 36 (FIG. 4) and thus exert some force to hold the stick in compression and maintain its integrity.

While one or both ends of the overwrap may be gathered and closed, it is preferred that disposition of the tubular film in overwrapping relation with the shirred stick be such that the bore opening through at least one of the stick end faces 36, 34 is not occluded. This will allow loading the casing article onto a stuffing horn without the need to cut or remove the overwrap from in front of the stick bore.

The reel of flat feed stock casing most likely is made up of several lengths connected by splices. One such splice is shown at 48 in FIG. 1. Various techniques are known for splicing casing and are disclosed for example in U.S. Pat. Nos. 4,879,123; 4,736,775; 4,610,742; 4,391,302 and 4,032,176. The splice 48 is shown in more detail in FIG. 2. In this case the splice consists of the adjacent ends 50, 52 of two different lengths of casing. These ends 50, 52 are butted one against the other, telescoped one into the other or are otherwise positioned close enough that the ends are bridged by a splice member 54. In the embodiment as shown, the splice member 54 is a strip of adhesive tape which is wrapped around and pressed against the adjacent casing ends 50, 52. Preferably, the length of the splice tape is greater than twice the flat width of the casing. With this arrangement there is an excess of splice tape so that when the tape is wrapped around the casing, the excess length is adhered to itself so as to form a flag 56 extending from the casing. While the reel 20 may contain one or more splices, it should be appreciated that as the casing in the reel runs out, its terminal end will be spliced to the leading end of a fresh supply reel.

The splice itself is shirrable so the spliced portion of casing will pass through the shirring rolls. In this respect, FIG. 1 shows the shirred strand 24 as having a splice wherein the flag 58 of splice tape extends from the surface of the shirred strand. It is possible for the flag 58 to be folded during shirring so it lies buried between adjacent pleats of casing. When this occurs the operator, prior to compaction, separates the adjacent pleats and extracts the flag. To alert the operator that a splice is entering the shirring rolls, a splice detector 60 is positioned upstream of the shirring rolls. This detector can be any suitable sensing device. When the detector 60 senses the passage of a splice it triggers an alarm to signal the operator to inspect the shirred strand being produced and, if necessary, to extract the flag of splice tape from between adjacent pleats.

Once the shirred stick 28 is disposed within the plastic tubular film overwrap 38, the overwrap will press the splice flag 58 against the shirred stick surface 42. To expose the flag the operator visually locates the splice through the clear plastic overwrap and then cuts a window 62 in the overwrap over the splice (FIG. 4) being careful not to cut into the casing below the overwrap. The operator then extracts the splice flag 58 by pulling it through the window so it stands out from the outer surface of the overwrap 38. Thus, as shown in FIG. 4, the shirred fibrous casing article generally indicated at 64 is composed of the two shirred and compacted lengths 28A, B joined by a splice and disposed within overwrap 38 wherein a flag 58 attached to the splice extends through a window 62 formed in the overwrap. The opposite ends 64, 66 of the casing article are open to permit a stuffing horn to access the bore of the shirred stick within the overwrap so the article can be loaded onto a stuffing horn.

FIG. 5 shows that in use, the casing article 64 of FIG. 4 is loaded onto a stuffing horn 68. Reference is made to U.S. Pat. No. 4,017,941 for a more detailed description of a stuffing machine and its operation. As shown in FIG. 5, the horn extends through overwrap end portions 44, 46 and the stick bore 32. The stuffing machine includes a lanyard 62. A clip 64 on the end of the lanyard is attached to flag 58. The other end of the lanyard is attached to a switch (not shown) for initiating a sequence of steps to terminate stuffing.

For stuffing, the casing is drawn from the shirred stick through the open overwrap end 44 and along the horn to the left as viewed in FIG. 5. Eventually the splice including the flag 58 also will draw forward for stuffing. This pulls the flag inside the window and beneath the overwrap. When this happens the clip also enters through the window and the lanyard 62 pulls taught. This triggers the switch to terminate the stuffing operation. The operator then is able to manually clear the splice through the machine and beyond the end 66 of the stuffing horn. The spliced portion is discarded and the casing is closed off so stuffing can begin anew.

The overwrap end portion 46 then is rolled back or torn to expose the pleats at the stick end 36. This allows the operator to attach of clip 64 to the last pleats at the trailing end of the stick. When the lanyard is pulled taught again, it will mean that the remainder of the fibrous casing has been used up and that little or no casing remains on the horn.

Where the machine does not have an automatic shut off, the operator can use the movement of the flag through the window and into the overwrap as a visual signal to manually shut off the stuffing machine.

Having described the invention in detail, what is claimed as new is:

1. A method for forming a shirred fibrous casing article having an internal bore including the steps of:
   a. providing two portions of fibrous casing each containing about 20% to about 30% moisture based on total casing weight, the two portions being joined together at a splice to form a continuous casing length and having a flag associated with the splice;
   b. drawing the continuous casing length onto and along a shirring mandrel and shirring the casing including the splice about the mandrel to form a shirred stick composed of at least said two spliced together portions;
   c. doffing the shirred stick from the mandrel and inserting the shirred stick into a retainer which encompasses and presses against said stick including at least a portion of the opposite ends of said stick so as to retain the integrity of said stick;
   d. locating the splice through the retainer;
   e. forming a window in said retainer to expose said splice; and
   f. extracting said flag and extending it through said window.

2. A method as in claim 1 wherein said splice includes adhesive tape wrapped around and adhered to adjacent ends of said two fibrous casing portions, said tape being longer than the circumference of said casing and said excess length being adhered to itself to form said flag.

3. A method as in claim 1 wherein said retainer is a tubular plastic stretch film having an unstretched diameter smaller than the diameter of said stick, and at least one end of said tubular plastic film is diametrically stretched to accommodate the insertion of said shirred stick.

4. A method as in claim 3 wherein the step of forming said window comprises cutting an opening in said tubular plastic film after inserting said shirred stick.

5. A method as in claim 3 wherein said tubular plastic stretch film is a tubular clear plastic stretch film, said splice is visually located through said film and a portion of said film is cut out to form said window.

* * * * *